United States Patent [19]

Reiterman

[11] Patent Number: 4,927,301
[45] Date of Patent: May 22, 1990

[54] ADJUSTABLE BORING BAR CARTRIDGE

[75] Inventor: Lee Reiterman, Royal Oak, Mich.

[73] Assignee: GTE Valenite Corporation, Troy, Mich.

[21] Appl. No.: 290,600

[22] Filed: Dec. 27, 1988

[51] Int. Cl.⁵ ..................... B31B 29/02; B31B 29/14; B31B 29/22

[52] U.S. Cl. .................... 408/180; 408/155; 408/156; 408/187; 407/45; 407/46

[58] Field of Search .............. 82/1.2, 12; 407/37, 407/38, 39, 44, 45, 46, 76, 81, 83, 89; 408/153, 154, 155, 156, 180, 181, 187

[56] References Cited

U.S. PATENT DOCUMENTS

| | | | |
|---|---|---|---|
| 2,155,595 | 4/1939 | Harten | 407/37 |
| 3,880,545 | 4/1975 | Kress | 408/153 |
| 3,885,282 | 5/1975 | Pataky | 407/89 |
| 3,918,826 | 11/1975 | Friedline | 408/180 |
| 4,451,185 | 5/1984 | Yamakage | 408/180 |
| 4,470,731 | 9/1984 | Erkfritz | 407/38 |
| 4,631,994 | 12/1986 | Jester | 408/187 |
| 4,692,069 | 9/1987 | Kieninger | 408/180 |

Primary Examiner—William Terrell
Attorney, Agent, or Firm—David J. Koris

[57] ABSTRACT

An adjustable cartridge to be mounted in a boring bar, the cartridge including a anvil rotatably affixed to said boring bar, the anvil including a pocket into which a lay-down indexable insert is affixed. The anvil is secured in an axially oriented slot which includes an arcuate seating face. Rotation of the anvil within the slot effects radial adjustment of the insert.

14 Claims, 2 Drawing Sheets

ADJUSTABLE BORING BAR CARTRIDGE

FIELD OF THE INVENTION

The present invention relates to the field of machining tools such as boring bars and more particularly to boring bars with adjustable insert cartridges. The boring bar includes a slotted area with an arcuate bottom face on which a correspondingly shaped surface of an anvil is seated. The boring bar also includes means for causing the anvil to slide upon a radiused surface of the boring bar and to rotate the anvil and cutting insert affixed thereto relative to the boring bar.

BACKGROUND OF THE INVENTION

In modern day boring bar applications higher and higher speeds are achieved. At whatever levels, however, each application must be evaluated in terms of a wide range of variables, and in terms of the increasing demand for precision tooling.

In developing boring bar equipment it is desirable to provide rapid adjustment of indexable inserts without sacrificing accuracy due to traverse bar loading. With respect to boring bar equipment, which include the use of adjustable cartridges coupled to the bar, it is desirable that design improvements include a cartridge which is economical to manufacture, easy to use and one which will accommodate existing cutting inserts. To achieve the desired accuracy in machining it has been found necessary to adjust for the manufacturing tolerances of the cutting insert and cartridge to which it is affixed. Without being bound by a theory of operation, it is believed that some means of adjustment is necessary because the stacking of manufacturing tolerances between the boring bar, cartridge, and insert cannot be compensated for using fixed pocket designs. Cartridge designs affixed to the periphery of a boring bar by screws, clamps, or wedges, and which focus on the tolerance problem by affording adjustment, either are excessively massive, resulting in moment arms destructive to high speed boring bars, or communicate the adjustment force to the bar creating bowing conditions. It is desirable to alleviate these problems by providing an improved adjustable cartridge.

Cartridges which provide adjustment for cutting inserts are known. For example, U.S. Pat. No. 3,885,282 to Pataky describes a machining tool including a holder and insert to which a cutting tool can be attached. The insert is rotatably mounted in a recess in the holder and fixed in a desired position relative to the holder by a locking screw. Rotatable adjustment of the insert allows for the altering of the tip working angle. In U.S. Pat. No. 4,631,994 to Jester et al, a linearly and angularly adjustable holder for a cutting tool is provided. Such tool permits pivotal adjustment by means of an adjustment screw having a threaded portion seated in a basic element and a head which engages a recess in a rotatably mounted receptacle element which holds a cutting tool insert. Rotation of the adjustment screw causes rotation of the receptacle element. However, the structure described in these patents is not directed to alleviating the problem of "stacked" tolerances as described herein. In addition, high speed boring bars cannot meet the precision cutting parameters required today with traditional cartridges mounted to the periphery of the boring bar due to the chatter created. Although creating a recess large enough to seat the cartridge within the bar may stablize the bar, radial adjustment where the adjustment force is directed against the bar would still induce bowing in narrow diameter boring bars. It is therefore desirable to provide an adjustable insert cartridge recessed within a boring bar where the force required for radial adjustment of the insert is insufficient to induce bowing in narrow bars. It is further desirable to provide an adjustable cartridge which is properly balanced particularly in high speed applications. None of the prior art deals with these considerations.

SUMMARY OF THE INVENTION

This invention achieves these and other objects by providing an adjustable cartridge in a rotatable boring bar. The boring bar has a longitudinally oriented slot or recess with planar parallel walls which are spaced by the width of an arcuate seating surface. The seating surface intersects with the walls and opens radially to the periphery of the boring bar. The cartridge includes an anvil with a top face and a radiused bottom face. The top face includes a recessed pocket for receipt of an indexable insert, positioned between forward and rear portions. The radiused face of the anvil extends between the forward and rear portions and when seated within the slot, abut against the corresponding radiused face. The forward and rear portions are recessed for receipt of means for preloading the anvil in said arcuate seat, and means for adjusting the anvil along the arcuate seat respectively.

The insert is positioned on the anvil axially spaced from the rotational center of the anvil such that fine adjustment may be accomplished and such that loading resulting from cutting operations is principally transferred to the bar. Inwardly directed cutting reaction forces on the cutting edges thus tend to load the anvil the adjusting means rather than the preload means. An advantage of the embodiment being that the resilient preloading means is removed from the loading action, allowing for precision adjustment while minimizing chatter. Another advantage is that an indexable insert and adjustable cartridge is provided in a boring bar without removing of a large portion of bar stock thereby maintaining tool strength. A further advantage is that the rotation of the anvil in the boring bar eliminates the need for adjustment means which load the boring bar to the extent of inducing bowing in small diameter bars.

BRIEF DESCRIPTION OF THE DRAWINGS

The objects, features, and advantages of the present invention will be more thoroughly understood by the figures described below wherein.

DETAILED DESCRIPTION OF A PREFERRED EMBODIMENT

Figure 1:
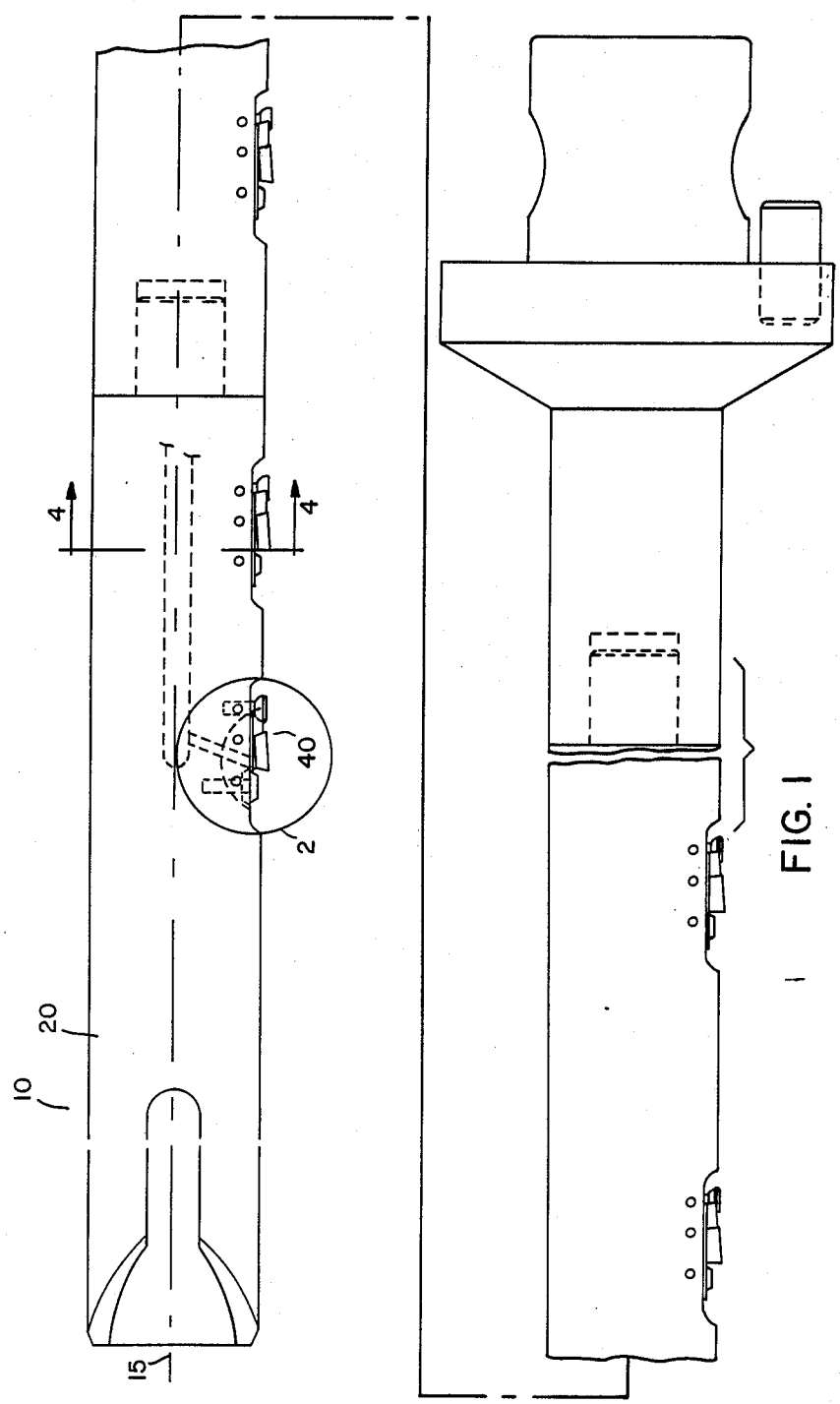
FIG. 1 is a side view of a boring bar containing a plurality of adjustable cartridges.
Figure 2:
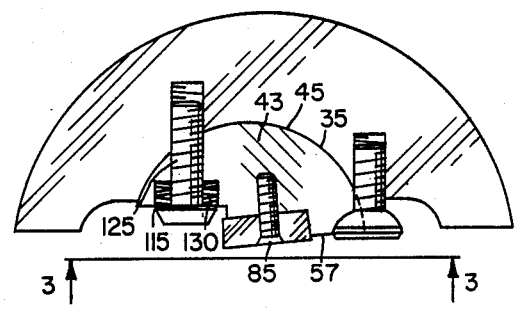
FIG. 2 is an enlarged sectional view of the embodiment of FIG. 1 illustrated in detail 2.
Figure 4:
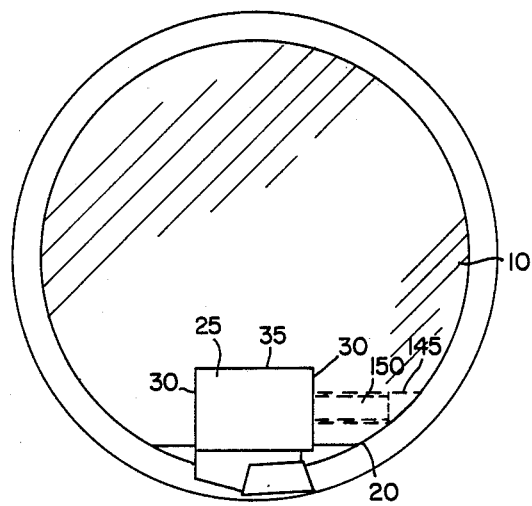
FIG. 4 is an axial view of FIG. 1 taken through line 4—4.

Referring to FIGS. 1 and 2, a boring bar 10 is provided for rotation about a longitudinally disposed axis 15. Boring bar 10 as is known in the art is of cylindrical form having a periphery 20. Disposed about the periphery and illustrated in FIG. 4, is a plurality of axially dimensioned slots or recesses 25. In one particular embodiment, each recess 25 includes parallel walls 30 joined at an arcuate seating surface 35 which opens radially toward the periphery 20.

The cartridge 40 of FIG. 2 comprises an anvil 43 which is generally an elongated piece of hardened tool steel having a uniform width and an axial dimension corresponding to the particular recess 25 selected. The cartridge 40 further includes a radiused lower surface 45 which corresponds to the arcuate surface 35 to allow for axial rotation in the clockwise direction as indicated by arrow 50 or counterclockwise direction as illustrated by arrow 55.

Figure 5:
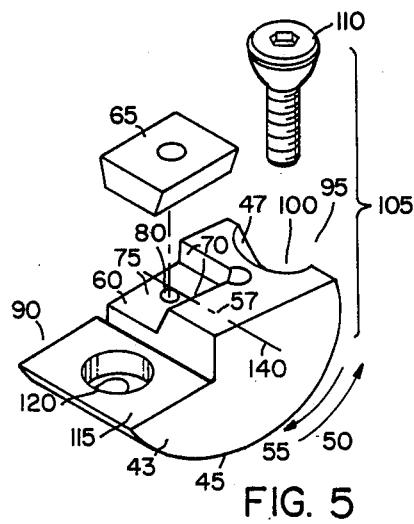
FIG. 5 is an exploded perspective view of the embodiment illustrated in FIG. 2.

Referring to FIG. 5, anvil 43 further includes a top face 57 radially spaced from lower surface 45 and at least one pocket 60 for receipt of lay down indexable insert 65. The pocket has at least two abutment walls 70 which intersect with a seating face 75. Seating face 75 includes an aperture 80 tapped to provide secure retention for an insert retaining screw 85. Although other securing means are available to those of ordinary skill in the art such as wedges, pins or clamps, a standard "iso" screw is preferred due to space and weight considerations near the work piece.

Referring again to FIG. 2, top face 57 includes axially spaced forward 90 and rear portions 95 separated by insert 65. Arcuate lower surface 45 extends from the forward 90 to rear 95 potions. The rear portion 95 includes a first recessed area 100 which communicates motion from means for adjusting the cartridge and inducing counterclockwise rotation in the direction of arrow 55 radially adjusting the insert 65. Although the range of adjustment is at least as much as the total "stacked" manufacturing tolerances of cartridge 40 and bar 10, a range of adjustment through adjustment means 105 of as much as 0.020 inches is preferred.

Figure 3:
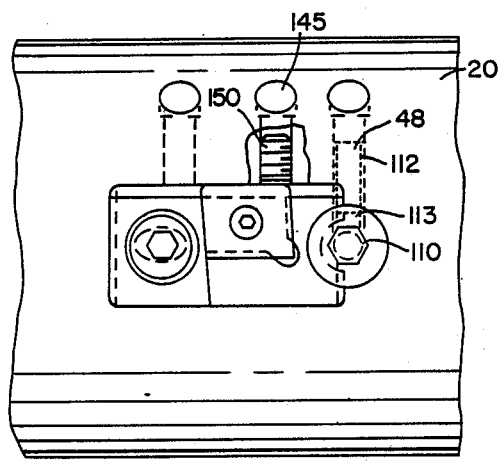
FIG. 3 is a plane view of the embodiment of FIG. 2 taken from the direction of line 3—3.

In particular, adjusting means 105 comprises an arcuate headed screw 110 threaded in the boring bar 10 and abutting a conical face 47 of the first recessed area 100 to provide camming force to the anvil 43. In order to eliminate slippage, a right hand screw thread is desired with a fine pitch and in particular with 32 threads per inch. As illustrated in FIG. 3, a securing screw 48, for preventing rotation of screw 110, traverses aperture 112 and forces a soft metal shoe 113 against screw 110. Other embodiments including direct seating on flat areas of screw 110 will be apparent to those skilled in the art. Those skilled in the art will recognize that other embodiments are also apparent such as the use of a clamp.

The forward portion 90 includes a second recess area 115 and aperture 120 which traverses anvil 43. Means for preloading the anvil 43 in recess 25 during adjustment is provided in one embodiment of the present invention as illustrated in FIG. 2. Screw 125 traps spring washers 130 in second recessed area 115 and threads into body 10 compressing the spring washers against the anvil to provide a resilient preloading force. The present invention also contemplates the use of screw 125 without washers 130.

Lay-down inserts 65 comprise generally a wafer of hardened material such as tungsten carbide, ceramics, cermets or sialons to name a few. The desired material is dependent on the type of application and the boring parameters. For example, on a 2 ⅛ inch boring bar about 32 inches in length and employing five adjustment cartridges as claimed and disclosed herein, ⅜ wide by 0.460 inch parallelogram shaped inserts available from GTE Valenite Modco using tungsten carbide grade VC-2 are employed for soft and abrasive materials such as cast iron. For boring applications in carbon steel, carbide grade VC-5 is available. In addition, various positive radial and negative axial rakes are contemplated depending on the application. When boring in carbon steel, it is preferable to employ parallelogram-shaped inserts using a positive radial and axial rakes. In cutting materials such as cast iron, negative axial and radial rakes are employed. It will be recognized by those of skill in the art that the range of axial and radial rake angles will depend on a range of variables including the part specifications.

The position of insert 65 and insert pocket 60 on top face 57 is important to obtaining the above disclosed range of adjustment. Referring to FIGS. 4 and 5, anvil 43, when rotated within recess 25 in the direction of arrows 50 or 55, rotates about center 140 when unrestricted by the preloading or adjustment means discussed above. Positioning pocket 60 and insert 65 axially from center 140 toward forward portion 90 results in a decreasing range of adjustment the closer the pocket is placed to center 140. Although the exact position of the pocket 60 in anvil 43 depends in part on the size of the insert and anvil, it is generally known to those of skill in the art that loading during operation is absorbed by the boring bar rather than preloading means or adjusting means the closer the pocket 60 is placed to center 140. This results in reduced cartridge chatter and wear on the adjustment means.

Referring to FIGS. 3 and 4, in order to secure anvil 43 against one of the recess walls 30, the present invention in at least one embodiment contemplates a plurality of tapped apertures 145 which traverse boring bar 10 in a direction generally normal to the recess walls 30 and which open to the boring bar periphery 20 to provide access to an operator. Screws 150, threaded to travel within apertures 145 are are rotated into secure abutment with anvil 43, forcing the anvil against one of the pair of parallel recess walls 30. In one embodiment, the screws are made of a resilient material such as neoprene or hardened materials such as steel. Other materials and methods are contemplated by the present invention such as the use of spring loaded set screws which communicate with recess 25 and anvil 43, driving the anvil against the recess walls 30. The use of screws of resilient material are preferred due to the preloading characteristics and the minimal material removal requirements to form apertures 145.

In operation, rapid adjustment of the radial position of the inserts 65 is accomplished by loosening the lock screw 48 thereby relaxing tension on adjustment screw 110. Adjustment screw 110 is then rotated, forcing arcuate screw head 110 against conical surface 47 of the first recess 100 of rear portion 95 of anvil 43. The camming force developed between screw head 110 and first recess 100 drives anvil 43 along arcuate seat surface 35, rotating anvil 43 in the direction of arrow 55. Insert 65, spaced axially from the rotational center 140 of the anvil is generated radially. At the desired point of adjustment, screw 110 is resecured with lock screw 48 seating anvil 43 in recess 25.

I claim:

1. A boring bar assembly comprising a generally cylindrical body rotatable about a centrally disposed axis, said body comprising a peripheral surface area and at least one recess, an adjustable cartridge for receipt into said recess, said recess having an axial length dimension and spaced walls substantially parallel with respect to each other and said axis, said recess further including an arcuate seating surface which intersects said walls and opens radially to the periphery, said cartridge comprising an anvil having a generally planar top face and a radiused bottom face cooperating with said arcuate seating surface to define a rotational adjustment path, said top face further comprising axially spaced forward and rear portions, said radiused face extending from said rear portion, a pocket for receipt of a polygonal form lay down indexable insert, means for adjusting said cartridge in said boring bar along said adjustment path, means for preloading said anvil in said slot towards said adjustment means, said rear portion having a first recessed area for receipt of said cartridge adjustment means, said forward portion having a second recessed area for receipt of said preloading means, said anvil having a center point about which said anvil rotates, said insert having a cutting edge seated in said anvil with said edge spaced axially from said center point so to impart rotational force about said center point and loading on said bar adjustment means during operation, and means for forcing said anvil toward at least one of said recess walls.

2. The cartridge of claim 1 wherein said preloading means comprises a screw which traverses said anvil and threads into said boring bar, and spring washers which are trapped in said second recess by said screw.

3. The cartridge of claim 1 wherein said adjusting means comprises a screw threaded in said boring bar and abutting said rearward portion to drive said anvil along said seat in a counterclockwise rotation and thereby effect radial adjustment of said cutting edge.

4. The cartridge of claim 3 wherein said cutting edge has a neutral axis rake and a positive radial rake.

5. The cartridge of claim 4 wherein said rearward portion comprises a conical seat for said screw.

6. The cartridge of claim 5 wherein said adjusting means provides a range of radial adjustment of about 0.020 inches.

7. The cartridge of claim 6 wherein said insert is parallelogram in form.

8. The cartridge of claim 7 wherein said means for forcing said anvil toward said recess wall comprises a plurality of apertures which traverse said boring bar normal to said recess walls and open to said periphery and recess, said apertures are threaded for receipt of screws which when rotated in said apertures enter said recess and secure said anvil against one of said walls.

9. A boring bar assembly comprising a generally cylindrical body rotatable about a centrally disposed axis, said body comprising a peripheral surface area and at least one recess, an adjustable cartridge for receipt in said recess, said recess having an axial length dimension and spaced walls parallel with respect to each other and said axis, said walls extending for said axial length dimension, said recess further including an arcuate seating surface which intersects said walls and opens radially to said periphery, said cartridge comprising an anvil having a generally planar top face and a radiused bottom surface, said top face further comprising axially spaced forward and rear portions separated by a pocket for receipt of a polygonal form lay down indexable insert, means for preloading said anvil in said recess, means for adjusting said cartridge in said boring bar, said radiused surface extending from said rearward to forward portion, said rearward portion having a first recessed area for receipt of said adjustment means, said adjustment means comprising a screw threaded in said boring bar and abutting said rearward portion to drive said anvil along said arcuate surface in a counterclockwise direction thereby effecting radial adjustment of said insert, said forward portion having a second recessed area for receipt of said preloading means, said preloading means comprising a screw which traverses said anvil and threads into said boring bar, and spring washers which are trapped in said second recess by said screw, said anvil having a center point about which said anvil rotates, said insert having a cutting edge seated in said anvil with said edge spaced axially from said center point so to impart rotational force about said center point and loading on said adjustment screw rather than on said preloading screw, and means for forcing said anvil toward at least one of said recess walls.

10. The cartridge of claim 9 wherein said cutting edge has a neutral axis rake and a positive radial rake.

11. The cartridge of claim 10 wherein said first recessed area comprises a conical seat for said adjustment screw.

12. The cartridge of claim 11 wherein said adjusting means provides a range of radial adjustment for said insert of about 0.020 inches.

13. The cartridge of claim 12 wherein said insert is parallelogram in form.

14. The cartridge of claim 13 wherein said means for forcing said anvil toward said recess wall comprises a plurality of apertures which traverse said boring bar in a direction normal to said recess walls and which open to said periphery and recess, said apertures are threaded for receipt of screws which when rotated in said apertures enter said recess and secure said anvil against one of said walls.

* * * * *